US006894231B2

(12) United States Patent
Winograd et al.

(10) Patent No.: US 6,894,231 B2
(45) Date of Patent: May 17, 2005

(54) BUS TWISTING SCHEME FOR DISTRIBUTED COUPLING AND LOW POWER

(75) Inventors: Gil I. Winograd, Aliso Viejo, CA (US); Bibhudatta Sahoo, Tustin, CA (US); Esin Terzioglu, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 205 days.

(21) Appl. No.: 10/100,872

(22) Filed: Mar. 19, 2002

(65) Prior Publication Data

US 2003/0179599 A1 Sep. 25, 2003

(51) Int. Cl.[7] .................................................. H01R 12/04

(52) U.S. Cl. ........................... 174/261; 365/63; 365/69; 174/44; 174/33

(58) Field of Search ........................... 174/261, 44, 33; 365/63, 69

(56) References Cited

U.S. PATENT DOCUMENTS

| | | | | | |
|---|---|---|---|---|---|
| 5,001,669 | A | * | 3/1991 | Cho et al. | 365/210 |
| 5,140,556 | A | * | 8/1992 | Cho et al. | 365/207 |
| 5,430,247 | A | * | 7/1995 | Bockelman | 174/33 |
| 5,550,769 | A | * | 8/1996 | Hidaka et al. | 365/63 |
| 5,602,773 | A | * | 2/1997 | Campbell | 365/69 |
| 5,822,268 | A | | 10/1998 | Kirihata | 365/230.03 |
| 6,411,557 | B2 | | 6/2002 | Terzioglu et al. | 365/200 |
| 6,424,554 | B1 | | 7/2002 | Kawasumi | 365/63 |
| 6,519,195 | B2 | * | 2/2003 | Kanno et al. | 365/203 |
| 2002/0075732 | A1 | * | 6/2002 | Ueno et al. | 365/198 |

* cited by examiner

*Primary Examiner*—Viet Q. Nguyen
(74) *Attorney, Agent, or Firm*—McAndrews, Held & Malloy, Ltd.

(57) ABSTRACT

The present invention relates to a system and method for equalizing the capacitance between at least two lines of a bus running in parallel for a portion of their length. The system and method include determining a twisting pattern for the lines using an algorithm. After determining the twisting pattern, the lines are twisted according to the pattern so that each of the lines runs along every other line for a same distance across the length of the bus.

20 Claims, 9 Drawing Sheets

BUS TWISTING SCHEME FOR DISTRIBUTED COUPLING AND LOW POWER

CROSS REFERENCE TO RELATED APPLICATIONS

[Not Applicable]

FEDERALLY SPONSORED RESEARCH OR DEVELOPMENT

[Not Applicable]

SEQUANCE LISTING

[Not Applicable]

BACKGROUND OF THE INVENTION

One embodiment of the present invention relates to bus twisting method. In particular, one embodiment of the present invention relates to an algorithm used to twist bus lines or wiring resulting in distributed coupling, lower capacitance and low power.

Memory structures have become integral parts of modern VLSI systems, including digital line processing systems. Although typically it is desirable to incorporate as many memory cells as possible into a given area, memory cell density is usually constrained by other design factors such as layout efficiency, performance, power requirements, and noise sensitivity.

In view of the trends toward compact, high-performance, high-bandwidth integrated computer networks, portable computing, and mobile communications, the aforementioned constraints can impose severe limitations upon memory structure designs, which traditional memory systems and subcomponent implementations may fail to obviate.

One type of basic storage element is the static random access memory (hereinafter referred to as "SRAM"), which can retain its memory state without refreshing as long as power is applied to the cell. In one embodiment of a SRAM device, the memory state is usually stored as a voltage differential within a bitable functional element, such as an inverter loop. A SRAM cell is more complex than a counterpart dynamic RAM (hereinafter referred to as "DRAM") cell, requiring a greater number of constituent elements, preferably transistors. Thus efficient lower-power SRAM device designs are particularly suitable for VLSI systems having need for high-density SRAM components, providing those memory components observe the often strict overall design constraints of the particular VLSI system.

Furthermore, the SRAM subsystems of many VLSI systems frequently are integrated relative to particular design implementations, with specific adaptations of the SRAM subsystem limiting, or even precluding, the scalability of the SRAM subsystem design. As a result SRAM memory subsystem designs, even those considered to be "scalable", often fail to meet such design limitations once these memory subsystem designs are scaled-up for use in a VLSI system needing a greater memory cell population and/or density.

A number of such memory structures, including SRAM modules or subsystems, not to mention the VLSI systems themselves among other systems and devices, have a number of lines, bitlines for example, that physically run in parallel (alternatively referred to as a "bus"). Switching one of the bitlines up and down on the bus may cause the other lines in spaced relationship to the switching lines, lines above and below for example, to couple with the switching lines, thus increasing the capacitance and power requirements of at least the line, if not the entire bus.

It is known to twist pairs of complimentary bitlines in memory structures, so as to equalize the capacitive coupling between such complimentary bitlines and adjacent pairs of bitlines.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

Features of the present invention may be found in a method and an algorithm used to twist bus lines or wiring, resulting in distributed coupling, lower capacitance and low power and a device having bus lines or wiring twisted according to such a method and algorithm. One embodiment of the present invention relates to a method for equalizing the capacitance between at least two lines. The method includes determining a twisting pattern for the lines using an algorithm. After determining the twisting pattern, the lines are twisted according to the pattern so that each of the lines runs along every other line for a same distance across the length of the bus.

One embodiment of the present invention relates to a method for equalizing the capacitance between at least two lines. This method includes determining a twisting pattern for the lines, then twisting the lines according to said pattern so that each of the lines runs along every other line for a same distance across at least a portion of the length thereof.

Yet another embodiment of the present invention relates to a device having at a plurality of lines, where at least two lines run in parallel for at least a portion of their length. These lines are twisted so each line runs along every other line for a same distance.

One embodiment of the present invention provides a memory device having at least one logical memory subsystem and a plurality of lines connected to the logical memory subsystem, where the lines running parallel for at least a portion of their length. The lines are twisted according to an algorithm so that a capacitance of the lines is equalized.

Other aspects, advantages and novel features of the present invention, as well as details of an illustrated embodiment thereof, will be more fully understood from the following description and drawing, wherein like numerals refer to like parts.

DETAILED DESCRIPTION OF THE INVENTION

Bus Twisting

Features of the present invention may be found in a method and an algorithm used to twist bus lines or wiring, resulting in distributed coupling, lower capacitance and low power; and a device or system having bus lines or wiring twisted according to such a method and algorithm. More specifically, one embodiment of the present invention may used with a memory architecture such as a SRAM module or subsystem similar to the SRAM module illustrated in commonly assigned application Ser. No. 10/100,757 titled "Synchronously Controlled, Self-Timed Local SRAM Block", the complete subject matter of which is incorporated herein by reference in its entirety. In particular, one embodiment of the present invention may be used with the disclosed Local Sense Amp including a plurality of untwisted bitlines, bit and bit_n for example, that physically run in parallel.

While the present invention is discussed with respect to a multiple bitlines in a memory architecture, a SRAM module or other memory device for example, it is contemplated that the present invention may be used with any system or device having a plurality of lines running in parallel, including busses on chips or boards for example, wherein switching one line may cause one or more of the other lines to switch.

Figure 1:
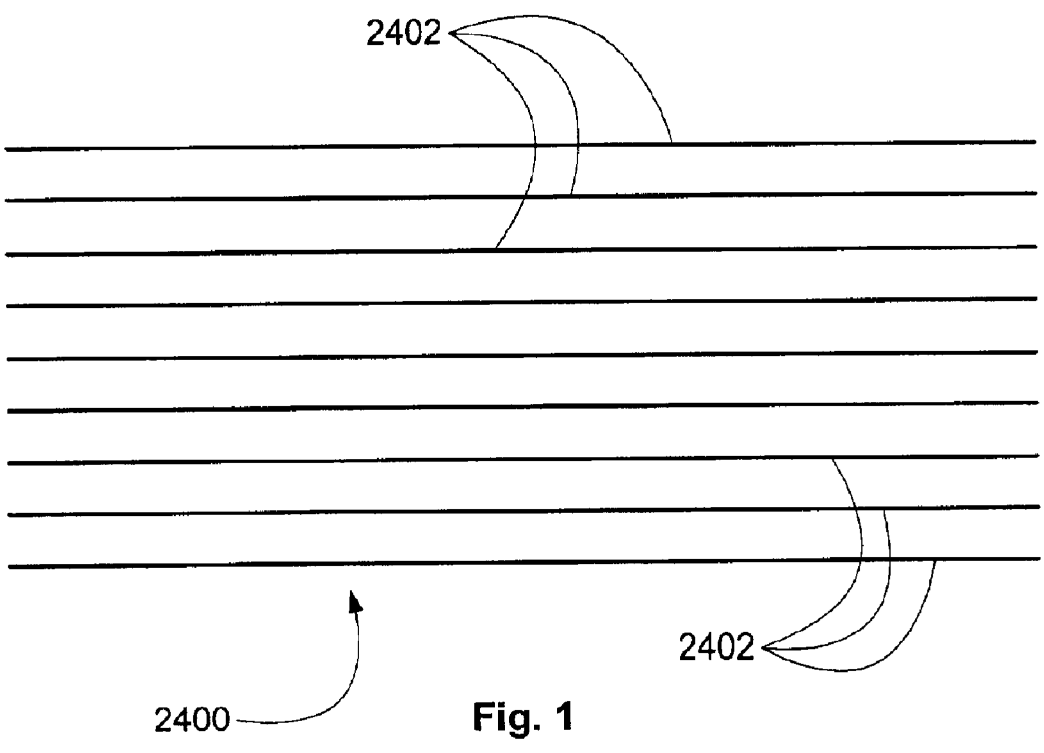
FIG. 1 illustrates an untwisted 9-bit bus line.

One example of an untwisted 9-bit bus line generally designated 2400 is illustrated in FIG. 1. Switching one of the bitlines 2402 up and down may cause the other lines, in spaced relationship to the switching lines, to couple with the switching lines, increasing the capacitance and power requirements of the bus 2400 and the bitlines 2402 on the bus.

In some memory devices, it is know to use shielded lines or power rails to separate the bitlines from nearby pairs, reducing coupling capacitance on the bus. Using such shield lines take up space in the memory structure. Furthermore, such shield lines have their own power requirements.

One embodiment of the present invention relates to minimizing the worst case power dissipation in a bus, having multiple parallel lines running along every other line in the bus for the same length. More particularly, one embodiment of the present invention relates to twisting a bus (similar to bus 2400 of FIG. 1) of multiple interconnect lines or bitline (similar to bitlines 2402) for the purpose of equalizing the capacitance between any two of the bit lines and reducing the maximum power dissipation. It should be appreciated that, if the bus switching (i.e., rising and falling transitions) are driven at different times, power dissipation may be reduced even further, as discussed below. Furthermore, if one of the bus lines is used as a reference, the power dissipation may be reduced even further through the use of limited swing techniques.

One embodiment of the present invention provides for twisting a set of n bus lines such that each line is coupled to every other line equally and each line runs along every other line in the bus for the same amount of distance across the length of the bus. One embodiment of the present invention, provides for using either n−1 or n identical twisting sections. Yet another embodiment of the present invention provides for one or more twisting sections connecting input lines to output lines according to an algorithm for n lines where the bus lines are numbered from i=0 to n−1 as follows:

| | |
|---|---|
| [A] i is even and less than n − 2 | line i goes to line i + 2 |
| [B] i is even and equals n − 2 | line i goes to line n − 1 |
| [C] i is even and equals n − 1 | line i goes to line n − 2 |
| [D] i is odd and greater than 1 | line i goes to line i − 2 |
| [E] i equals 1 | line i goes to line 0 |

Figure 2:
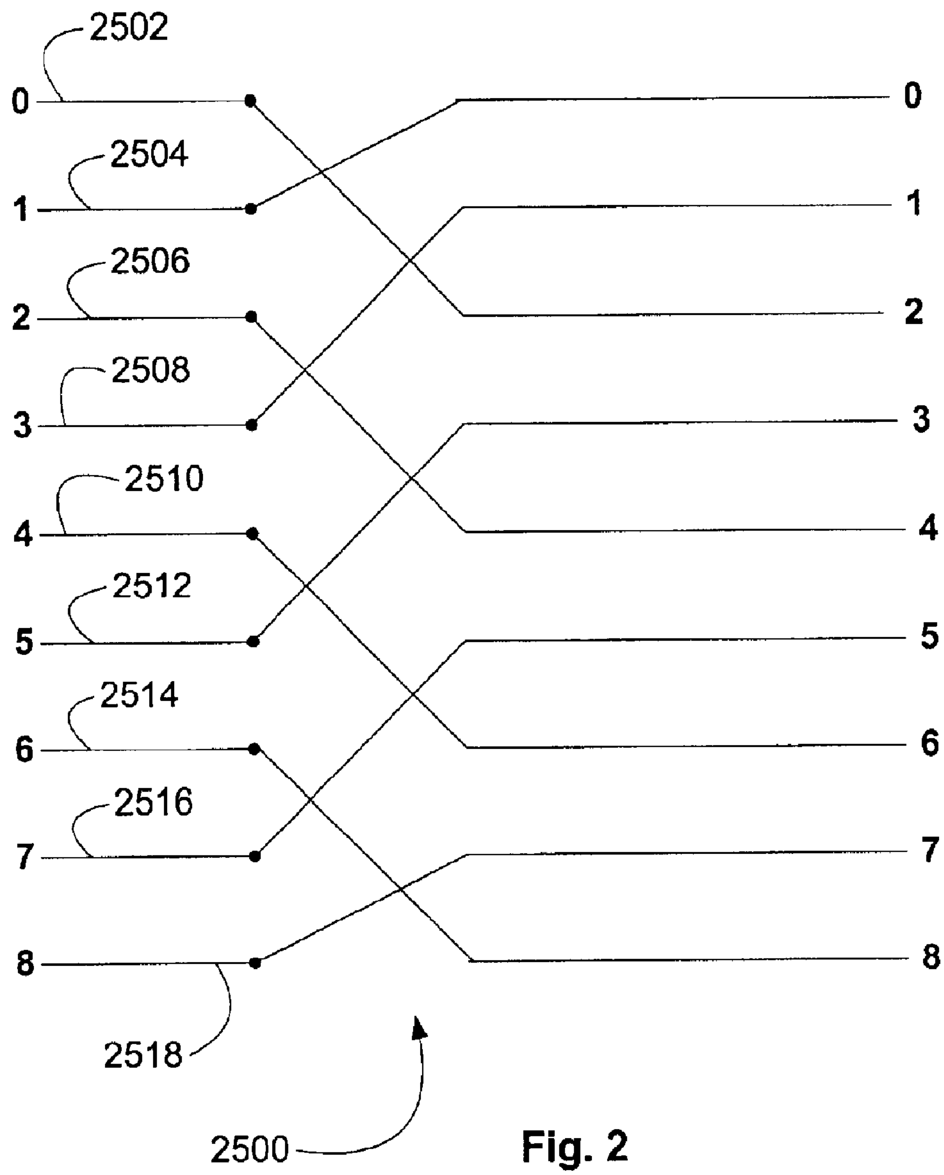
FIG. 2 illustrates a bus twisted according to an algorithm in accordance with one embodiment of the present invention.

For example, if a bus 2500 of 9 lines are to be twisted, n=9 and the lines are numbered 0 to 8 (i.e., i=0 to n−1=8) as illustrated in FIG. 2. The first line is line 0 (i.e., i=0) and designated 2502. As 0 is even and less than 7 (i.e., i goes n−2 is 9−2=7), then according to part [A] of the algorithm, line 0 is connected to line 2 (i.e., line i goes to line i+2 is 0+2=2). The second line in this example is line 1 (i.e., i now=1) and designated 2504. As i=1, then according to part [E] of the algorithm, line 1 is connected to line 0 (i.e., line i goes to 0 is line 1 goes to 0). The third line is line 2 (i.e., i now=2) and designated 2506. As 2 is even and less than 7 (i.e., 9−2), then according to part [A] of the algorithm, line 2 is connected to line 4 (i.e., 2+2=4).

The fourth line is line 3 (i.e., i now=3) and designated 2508. As 3 is odd and greater than 1 (i.e., i now=3 is odd and greater than 1), then according to part [D] of the algorithm, line 3 is connected to line 1 (i.e., line i goes to line i−2 is 3−2=1). The fifth line is line 4 (i.e., i=4) and designated 2510. As 4 is even and less than 7, then according to part [A] of the algorithm line 4 is connected to line 6 (i.e., 4+2=6). The sixth line is line 5 (i.e., i=5) and designated 2512. As 5 is odd and greater than 1, then according to part [D] of the algorithm, line 5 is connected to line 3 (i.e., 5−2=3). The seventh line is line 6 (i.e., i=6) and designated 2514. As 6 is even and less than 7, then according to part [A] of the algorithm line 6 is connected to line 8 (i.e., 6+2=8). The eighth line is line 7 (i.e., i=7) and designated 2516. As 7 is odd and greater than 1, then according to part [D] of the algorithm line 7 is connected to line 5 (i.e., 7−2=5). Finally, the ninth line is line 8 (i.e., i is now=8) and designated 2517. As i=8 is even and is equal to n−1 (i.e., 9−1=8), then line 8 is connected to line 7 (i.e., line i goes to line n−2 is 9−2=7).

Figure 3:
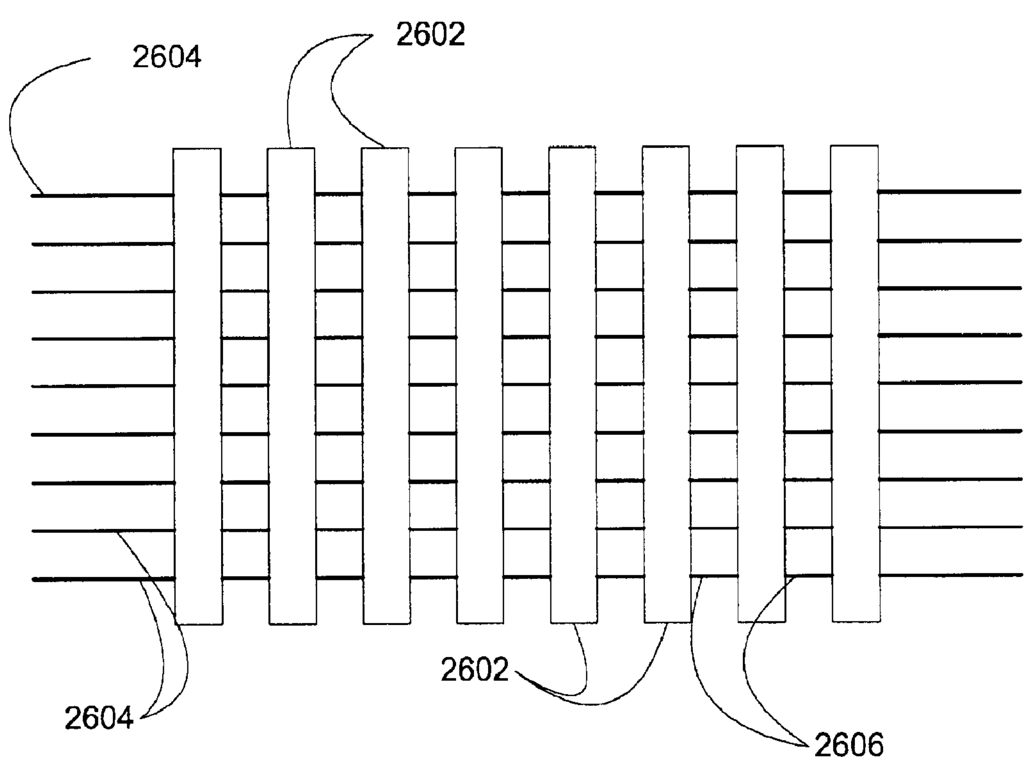
FIG. 3 illustrates a twisted 9-bit bus line with eight twist sections, where all bus sections are equal in length in accordance with one embodiment of the present invention.

FIG. 1 illustrates one embodiment of an untwisted bus 2400 of 9 lines 2402 as mentioned above. During signal transmission each line is capacitively coupled to its immediate neighbors (or neighbor) over the entire length of the bus, but is not coupled (to the first order) to more distant lines. FIG. 3 illustrates one embodiment of a twisted bus 2600 generally with n−1 twisting sections 2602 in accordance with the present invention. In this embodiment, as n=9, n−1=8 twisting sections 2602 are depicted. All the bus lines 2604 (including bus sections 2606) are equally coupled to each other because all the neighboring lines are of equal length. It should be appreciated that an additional feature of the illustrated twisted bus 2600 is that each individual line 2604 of the bus is located at the same position on the left and right hand sides thereof (i.e. the twisting unscrambles itself).

Figure 4:
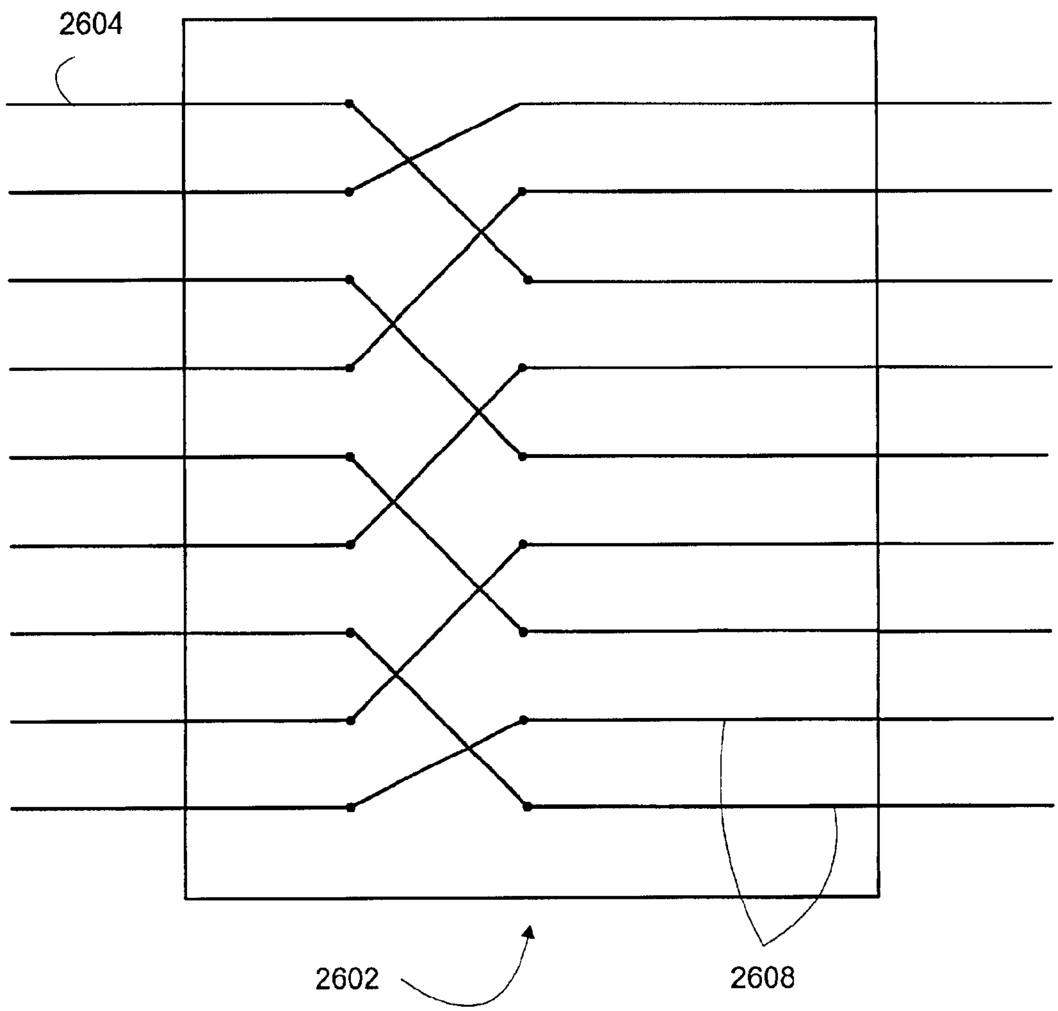
FIG. 4 illustrates the twisting section of FIG. 3 containing a twisted a-bit bus line in accordance with one embodiment of the present invention.

It should further be appreciated that the twisting pattern in each section 2602 is the same. As a result, assembling a memory subsystem, or any other system having a bus or parallel lines, using the twisting sections 2602 is straight forward, as the pattern is simply repeated n−1 (or n times) as provided below. One embodiment of twisting section 2062 containing twisted bus lines 2608 is illustrated in FIG. 4.

Figure 5:
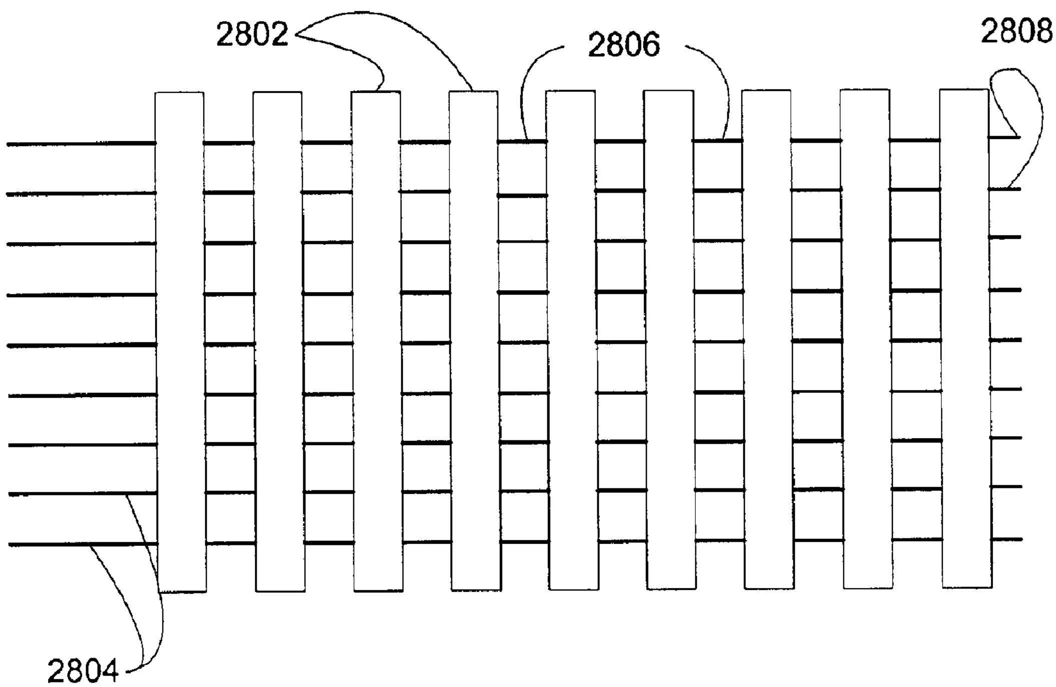
FIG. 5 illustrates a twisted 9-bit bus line with nine twist sections, where all bus sections are equal in length except the end in accordance with one embodiment of the present invention.

FIG. 5 illustrates an embodiment of a twisted bus 2800 with n twisting sections 2802, 9 for example, in accordance with the present invention. All the bus lines 2804 are equally coupled similar to that described previously. In this embodiment, sections 2804 are all the same length except section 2808, where section 2808 is used to descramble the output. In one embodiment, section 2808 has a length of zero.

Figure 6:
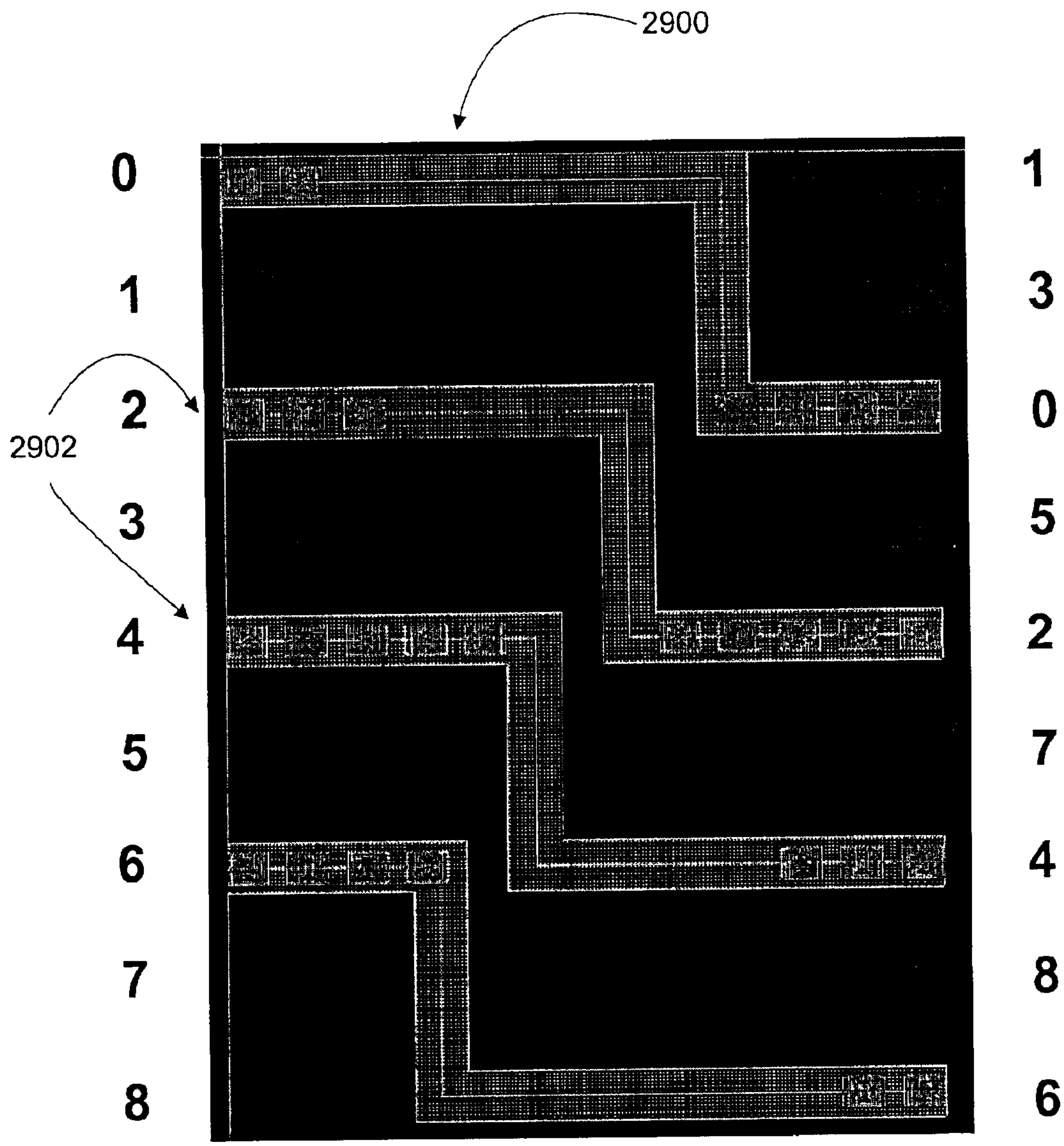
FIG. 6 illustrates a compact layout of a twisted section on two layers of metal in accordance with one embodiment of the present invention.

FIG. 6 illustrates one embodiment of the present invention comprises a compact layout 2900, where the interconnection is implemented on at least two metal layers. Several vias or interconnects 2902 are used at the metal interconnection points to reduce the overall contact resistance.

If the bus includes a large number of lines (i.e., the bus is very wide), in one embodiment the bus may be broken up into smaller bundles. For example if a wide bus contains 256 lines, the bus may be broken down into 32 bundles of 8 lines each. Each bundle may be individually twisted. In this embodiment, a shield line, similar to the shield lines illustrated in FIG. 12 may be inserted between adjacent bundles. The shield lines are adapted to prevent unequalized coupling between bus lines in adjacent bundles.

Staggering

Yet another embodiment of the present invention comprises staggering the bitlines, or more particularly staggering the signals on the bitlines of a bus. In this embodiment, a plurality of buffers 3000 (best viewed in FIG. 7) interface with at least one end of the bitlines, adapted to stagger the bitlines, or at least the signals or data on the bitlines. Staggering the lines reduces the maximum power consumption.

For an untwisted bus, each line in the bus sees a coupling capacity of $2C_C$ from each neighbor in the worst case so that power dissipation is Power=$\frac{1}{2}fV^2(2C_C+2C_C+C_G)$. However, for a twisted bus,each line in a bus sees, on the average, a coupling capacity $C_C$ from each neighbor, so that the power dissipation is Power=$\frac{1}{2}fV^2(C_C+C_C+C_G)$. Thus coupling capacitance for twisted bus is ½ of that for untwisted bus.

Data is transmitted across the lines in the bus at frequency f. During each transmission cycle, each line of the bus rises from VSS to VDD (i.e., switching up), falls from VDD to VSS (i.e., switching down) or remains the same if the data is unchanged from one cycle to the next. The capacitance for the full length of the bus between any one line on the bus and its immediate neighbor is represented as $C_C$. The capacitance between any particular line and ground is represented as $C_G$. The maximum power dissipation in all cases occurs when all the bus lines are switching, but each line is switching in the opposite direction to its two neighbors.

Figure 7:
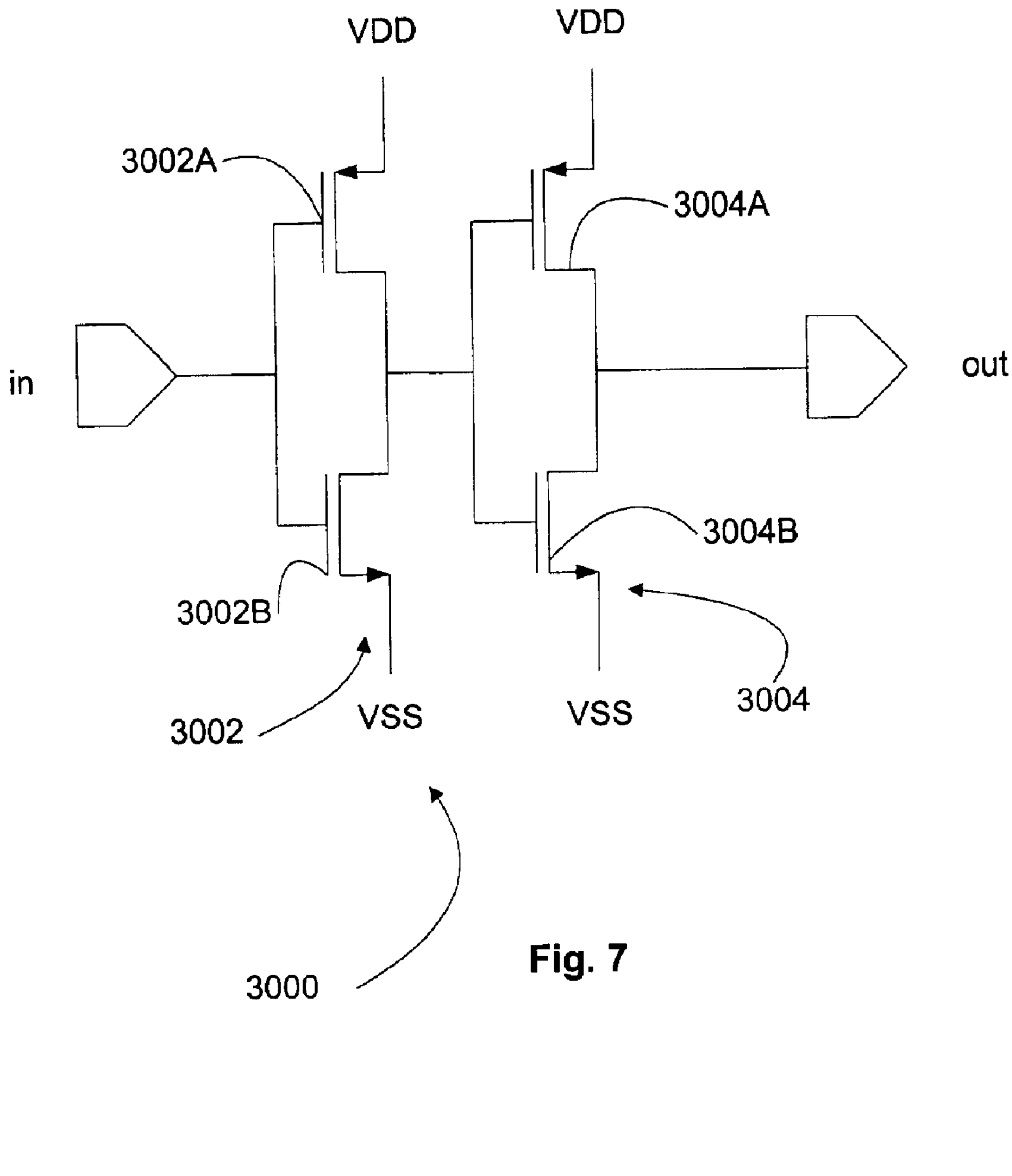
FIG. 7 illustrates a schematic for a skewed buffer circuit used to stagger transitions in accordance with one embodiment of the present invention.

As a further technique for reducing power consumption, the transitions may be staggered in time so that one line is switched first and its neighbor are switched later in time. FIG. 7 illustrates buffer 3000 in accordance with one embodiment of the present invention. In FIG. 7, buffer 3000 comprises two inverters 3002 and 3004, where the output of inverter 3002 is coupled to the input of inverter 3004. As illustrated, each inverter has a PMOS transistor, 3002A and 3004A, and a NMOS transistor, 3002B and 3004B.

In this embodiment, the two inverters 3002 and 3004 are skewed so that NMOS in 3002 and PMOS in 3004 are larger than the symmetric ratio. This arrangement results in a rising transition that propagates faster than a falling transition, thereby causing an output buffer (not shown) to switch up earlier (i.e., faster) than it switches down.

For an untwisted bus, each line in the bus sees a coupling capacity of $2C_C$ from each neighboring line, so that the power dissipation for each line is Power=$\frac{1}{2}fV^2(2C_C+2C_C+C_G)$. Each line in a twisted, staggered switching bus sees, on the average, a coupling capacitance of $\frac{1}{2}C_C$ from each neighboring line, so that the power dissipation is Power=$\frac{1}{2}fV^2(\frac{1}{2}C_C+\frac{1}{2}C_C+C_G)$.

The results are summarized in the following table:

| | Maximum power dissipation |
|---|---|
| Untwisted bus | $\frac{1}{2}fV^2(4C_C + C_G)$ |
| Twisted bus | $\frac{1}{2}fV^2(2C_C + C_G)$ |
| Untwisted staggered bus | $\frac{1}{2}fV^2(2C_C + C_G)$ |
| Twisted staggered bus | $\frac{1}{2}fV^2(C_c + C_G)$ |

Limited Swing Voltage

Figure 8:
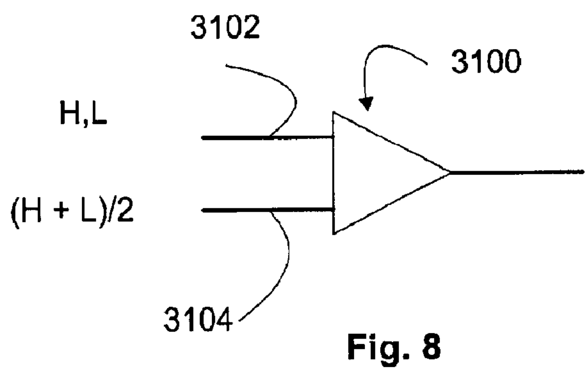
FIG. 8 illustrates an amplifier with two inputs amplifying a limited swing voltage to a full voltage in accordance with one embodiment of the present invention.

In yet another embodiment, generally the data or signal transmitted on any of the lines is switched from VSS to VDD (alternatively referred to as "rail-to-rail"). For example, data may be transmitted on any of the lines in one direction from 0 to VDD, or on in the other direction, from VDD to 0 as provided above. However, using an amplifier 3100 as illustrated in FIG. 8 amplifies a limited swing voltage. For example, amplifier 3100 may amplify the limited swing voltage to a full rail-to-rail voltage or some lesser voltage for example. It takes less power and is faster to switch the limited swing voltage than to switch a rail-to-rail voltage.

In one embodiment, the amplifier 3100 may have paired bitlines comprising a reference input signal and comparable input signals that are distinguishable or far enough apart from the reference input signal so the amplifier 3100 makes a correct determination. In the illustrated embodiment, amplifier 3100 includes an input 3102 for the high or low signals 3102 (alternatively referred to as "H" and "L") and an input 3104 for the reference signal. The input H may be equal to VDD, for example, input L may be equal to VDD−200 mv, while the reference may be equal to (H+L)/2.

For a large bus, a large number of amplifiers 3100 are generally required, each amplifier having a reference input and associated signal input for comparison. For example, a large bus may have 8 amplifiers, each amplifier 3100 having a reference input 3104 and its own input signal 3102. (H/L inputs).

Figure 9:
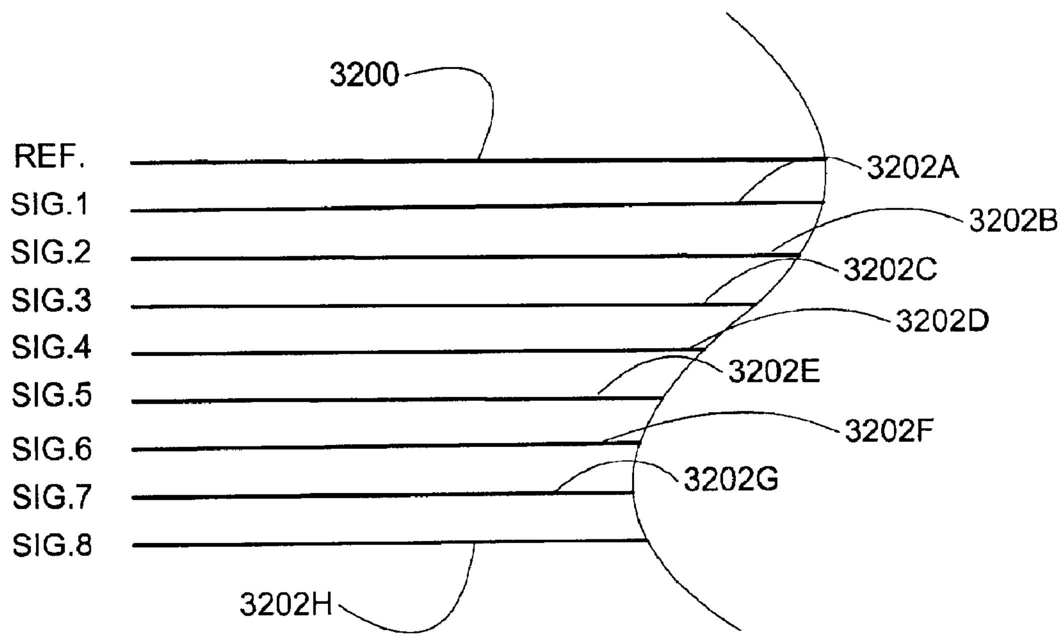
FIG. 9 illustrates one reference line and seven input lines twisted together and used with a limited swing voltage in accordance with one embodiment of the present invention.

However, one embodiment of the present invention comprises twisting one reference line with a plurality of input lines. Referring to FIG. 9, a reference line 3200 is twisted with 7 signal lines 3202A, 3202B, 3202C, 3202D, 3202E, 3202F, 3202G, and 3202H according to the algorithm discussed above. It should be appreciated that, in this embodiment, the reference line 3200 runs along every other line 3202A–3202H for the same distance, similar to that described above.

Figure 10:
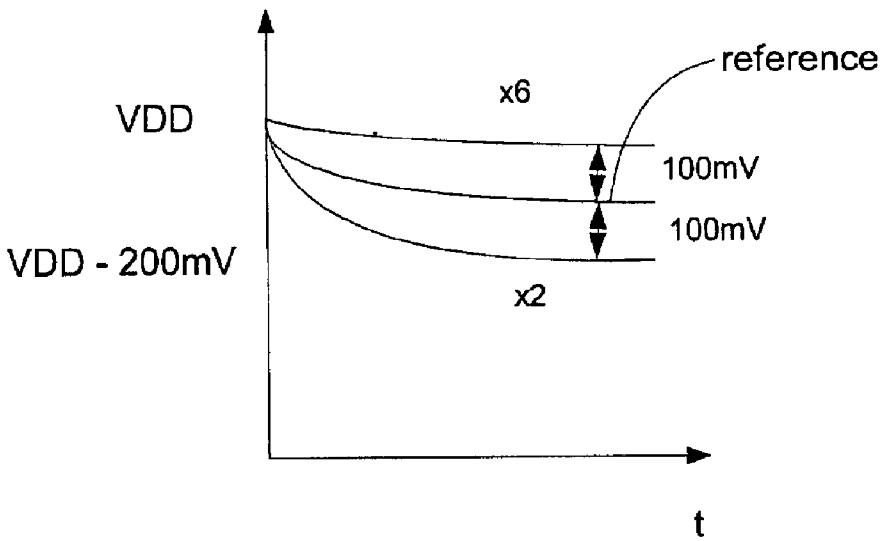
FIG. 10 illustrates a voltage drop for a twisted bus having one reference line and dropping the voltage in two lines in accordance with one embodiment of the present invention.
Figure 11:
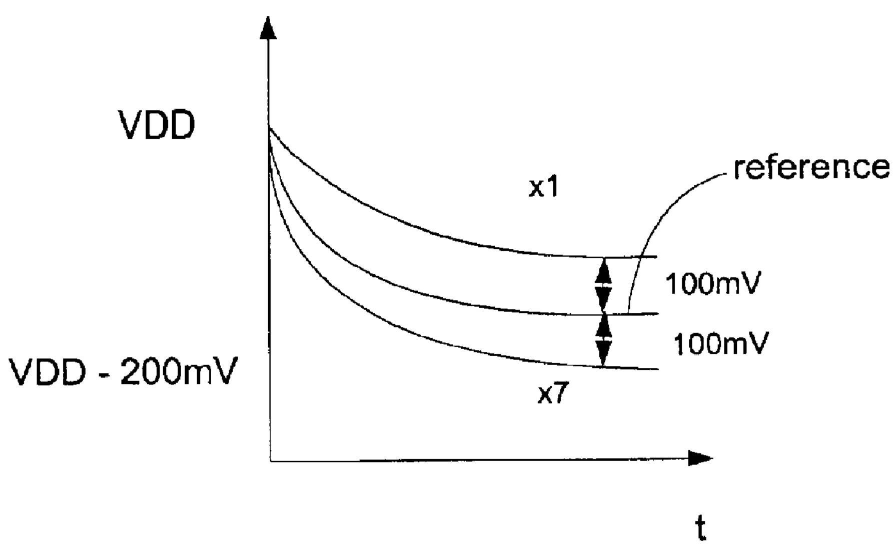
FIG. 11 illustrates a voltage drop for a twisted bus having one reference line and dropping the voltage in six lines in accordance with one embodiment of the present invention.

If one reference line 3200 and a plurality of input lines 3202A–3202H are used without twisting, the voltage drop for any one input line depends on its distance from the reference line 3200. However, in this embodiment, with twisting the reference line 3200 runs along every other line 3202A–3202H for the same distance, so that the drop for each line 3202 is the same. For example if 7 input lines are twisted with one reference line 3200, and the voltage across two input lines is dropped (6 lines aren't dropped), the total voltage drop is the same so that all the lines are pulled down by the same amount as illustrated in FIG. 10. If however the voltage on 7 lines is dropped and 1 line isn't, the voltage drop is still the same (i.e., the swing about the reference line is the same), although total drop is greater as illustrated in FIG. 11.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A method for equalizing the capacitance between at least two lines, the method comprising:

determining a twisting pattern for the lines;

twisting the lines according to said pattern so that each of the lines runs along every other line for a same distance; and staggering switching transitions for the lines.

2. The method of claim 1, wherein said twisting pattern is determined according to an algorithm.

3. The method of claim 1, wherein staggering said switching transitions includes switching up transitions.

4. The method of claim 1, wherein staggering said switching transitions includes switching down transitions.

5. The method of claim 1, including twisting at least a portion of the lines according to said twisting pattern, forming at least one twisting section.

6. The method of claim 5, further including forming a plurality of twisted sections.

7. The method of claim 6, including forming n twisted sections for n lines.

8. A method for reducing power consumption in a bus line, said method comprising:

staggering switching up and switching down transition in time; and skewing at least one inverter.

9. A method for equalizing the capacitance between at a plurality of lines forming a bus running in parallel for a portion of their length, the method comprising:

determining a twisting pattern for the lines;

twisting the lines according to said pattern so that each of the lines runs along every other line for a same distance across the length of the bus; and staggering switching transitions for the lines.

10. A device having at a plurality of lines comprising at least two lines running in parallel for it least a portion of their length, wherein the lines are twisted so each line runs along every other line for a same distance and are adapted to stagger data in at least two different directions.

11. The device of claim 10, wherein the lines are twisted according to an algorithm.

12. A memory device comprising;

at least one logical memory subsystem;

a plurality of lines connected to said logical memory subsystem running in parallel for at least a potion of their length; wherein said lines are twisted to equalize a capacitance of said lines; and a staggering device adapted to stagger data on said lines in at least two different directions.

13. The memory device of claim 12, further including at least one twisting section containing said plurality of twisted lines.

14. The memory device of claim 12, further including a plurality of twisted sections, said section containing said plurality of twisted lines.

15. The memory device of claim 14, wherein for n number of lines there are n twisted sections.

16. The memory device of claim 14, wherein for n number of lines there are n−1 twisted sections.

17. The memory device of claim 12, including an amplifying device adapted to limit a swing voltage on said lines.

18. A memory device comprising;

at least one logical memory subsystem;

n lines connected to said logical memory subsystem running in parallel for at least a portion of their length, wherein said n lines are twisted to equalize a capacitance of said lines; and at least one twisting section containing said n twisted lines.

19. The memory of claim 18, further including a plurality of twisted sections, wherein for n number of lines there are n twisted sections.

20. The memory device of claim 18, further including a plurality of twisted sections, wherein for n number of lines there are n−1 twisted sections.

* * * * *